United States Patent
Schwarz

[11] Patent Number: 5,961,705
[45] Date of Patent: Oct. 5, 1999

[54] INK COMPOSITIONS CONTAINING OXY ACIDS OR OXY ACID SALTS

[75] Inventor: William M. Schwarz, Webster, N.Y.

[73] Assignee: Xerox Corporation, Stamford, Conn.

[21] Appl. No.: 09/106,391

[22] Filed: Jun. 29, 1998

[51] Int. Cl.$^6$ .................................................. C09D 11/02
[52] U.S. Cl. ..................... 106/31.58; 106/31.86
[58] Field of Search .............................. 106/31.58, 31.86

[56] References Cited

U.S. PATENT DOCUMENTS 5,700,316  12/1997  Pontes et al. ......................... 106/31.58

OTHER PUBLICATIONS

Freemantle, "Designer Solvents", Mar. 30, 1998, C&EN, pp. 32–37.

*Primary Examiner*—Helene Klemanski
*Attorney, Agent, or Firm*—Judith L. Byorick

[57] ABSTRACT

Disclosed is an ink composition which comprises (1) water; (2) a colorant; and (3) an additive selected from the group consisting of oxy acids, oxy acid salts, and mixtures thereof. Also disclosed is a thermal ink jet printing process employing the ink.

20 Claims, No Drawings

INK COMPOSITIONS CONTAINING OXY ACIDS OR OXY ACID SALTS

BACKGROUND OF THE INVENTION

The present invention is directed to ink compositions and to processes for the use thereof. More specifically, the present invention is directed to compositions suitable for use in ink jet printing processes. One embodiment of the present invention is directed to an ink composition which comprises (1) water; (2) a colorant; and (3) an additive selected from the group consisting of oxy acids, oxy acid salts, and mixtures thereof.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

"Designer Solvents," M. Freemantle, Chemical and Engineering News, Mar. 30, 1998, pp. 32–37, the disclosure of which is totally incorporated herein by reference, discloses ionic systems consisting of salts that are liquid at ambient temperatures which can act as solvents for a broad spectrum of chemical processes.

Copending application U.S. Ser. No. 09/106,527, entitled "Inks for Ink Jet Printing With Reduced Intercolor Bleed," with the named inventor William M. Schwarz, filed concurrently herewith, the disclosure of which is totally incorporated herein by reference, discloses an ink composition which comprises water, an anionic dye, and a monoquaternary cationic penetrant of the formula

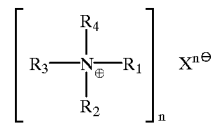

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, wherein the ink exhibits rapid penetration when applied to plain paper. Also disclosed is a set of inks for generating multicolored images which comprises (a) a first ink as described above; and (b) a second ink comprising water and a pigment; wherein intercolor bleed between the first ink and the second ink is reduced. Further disclosed are ink jet printing processes with the ink and ink set described above.

Copending application U.S. Ser. No. 09/106,396, entitled "Ink Compositions Containing Ionic Liquid Solvents," with the named inventor William M. Schwarz, filed concurrently herewith, the disclosure of which is totally incorporated herein by reference, discloses an ink composition which comprises water, a colorant, and an ionic liquid material. In a preferred embodiment, the ink is substantially free of organic solvents. Also disclosed is a process which comprises incorporating the ink composition into an ink jet printing apparatus and causing droplets of the ink composition to be ejected in an imagewise pattern onto a substrate.

Copending application U.S. Ser. No. 09/106,621, entitled "Ink Compositions Substantially Free of Organic Liquids," with the named inventors Kurt B. Gundlach, Maura A. Sweeney, Luis A. Sanchez, Richard L. Colt, and Melvin D. Croucher, filed concurrently herewith, the disclosure of which is totally incorporated herein by reference, discloses an ink composition which comprises water, an acid dye, a monovalent salt, a polyquaternary amine compound, and an optional surfactant, said ink being substantially free of organic solvents. The ink is particularly suitable for applications such as ink jet printing and marking pens. The disclosed inks in some embodiments are substantially indelible. Also disclosed is a composition for removing the ink compositions from substrates to which they have been applied which comprises water and a dianionic surfactant, optionally further containing a salt, urea, and/or a viscosity building agent such as a gum.

While known compositions and processes are suitable for their intended purposes, a need remains for improved ink compositions. In addition, a need remains for improved ink compositions suitable for use in ink jet printing processes. Further, a need remains for ink compositions containing improved humectants. Additionally, a need remains for ink compositions containing humectants which are compatible with a wide range of solvents. There is also a need for ink compositions which exhibit good heat stability. In addition, there is a need for ink compositions which enable generation of images with high optical density. Further, there is a need for ink compositions with desirable drying characteristics. Additionally, there is a need for ink compositions with good latency characteristics. A need also remains for ink compositions which can contain relatively high dye concentrations. In addition, a need remains for ink compositions which exhibit desirable interactions between the humectant and the colorant. Further, a need remains for ink compositions wherein the humectant is complexed with a cationic dye colorant. Additionally, a need remains for ink compositions which enable desirable interactions between the ink and a basic-sized paper substrate. There is also a need for ink compositions which reduce intercolor bleed. In addition, there is a need for ink compositions which enable improved edge sharpness.

SUMMARY OF THE INVENTION

It is an object of the present invention to provide improved ink compositions with the above noted advantages.

It is another object of the present invention to provide improved ink compositions suitable for use in ink jet printing processes.

It is yet another object of the present invention to provide ink compositions containing improved humectants.

It is still another object of the present invention to provide ink compositions containing humectants which are compatible with a wide range of solvents.

Another object of the present invention is to provide ink compositions which exhibit good heat stability.

It is yet another object of the present invention to provide ink compositions which enable generation of images with high optical density.

It is still another object of the present invention to provide ink compositions with desirable drying characteristics.

Another object of the present invention is to provide ink compositions with good latency characteristics.

Yet another object of the present invention is to provide ink compositions which can contain relatively high dye concentrations.

Still another object of the present invention is to provide ink compositions which exhibit desirable interactions between the humectant and the colorant.

It is another object of the present invention to provide ink compositions wherein the humectant is complexed with a cationic dye colorant.

It is yet another object of the present invention to provide ink compositions which enable desirable interactions between the ink and a basic-sized paper substrate.

It is still another object of the present invention to provide ink compositions which reduce intercolor bleed.

Another object of the present invention is to provide ink compositions which enable improved edge sharpness.

These and other objects of the present invention (or specific embodiments thereof) can be achieved by providing an ink composition which comprises (1) water; (2) a colorant; and (3) an additive selected from the group consisting of oxy acids, oxy acid salts, and mixtures thereof.

DETAILED DESCRIPTION OF THE INVENTION

The present invention is directed to an ink composition which comprises (1) an aqueous liquid vehicle; (2) a colorant; and (3) an additive selected from the group consisting of oxy acids, oxy acid salts, and mixtures thereof. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

In one embodiment of the present invention, the ink is substantially free of organic solvents, cosolvents, humectants, penetrants, or other materials, and the oxy acid or oxy acid salt additive performs these functions conventionally performed by organic cosolvents. By "organic solvents" is meant all organic cosolvents, humectants, penetrants, or other materials (other than the oxy acid itself and any optional surfactant components of the ink) which in their pure form are liquid at about 30° C. and about 1 atmosphere of pressure. In many instances, fluid, nonpolar solvents or cosolvents commonly used in ink jet inks, such as sulfolane, N-methyl pyrrolidinone, or the like, can have a tendency to feather on many types of papers. The presence of more viscous, hydrogen bonded solvents or cosolvents commonly used in ink jet inks, such as ethylene glycol and the like, can give somewhat sharper line edges, and the use of strong penetrants and/or reacting agents can have a marked effect on line edges and act to obliterate the natural tendencies of ink cosolvents to feather. Nevertheless, it is believed that better edge sharpness (MFLEN) can be obtained if nonpolar solvents are avoided.

Ink compositions of the present invention also include a colorant. Dyes are suitable colorants for the inks of the present invention. Any suitable dye or mixture of dyes compatible with the ink liquid vehicle can be used, with water soluble anionic dyes and cationic dyes being preferred. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Basic Yellow dyes (No. 17, 21, 51, and the like), Basic Red dyes (No. 1, 2, 5, 9, 29, and the like), Basic Blue dyes (No. 6, 7, 9, 11, 12, 16, 17, 24, 26, 41, 47, 66, and the like); anthraquinone dyes, monoazo dyes, disazo dyes, phthalocyanine derivatives, including various phthalocyanine sulfonate salts, aza[18]annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-1 75; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1 -G (Direct Yellow 132), Aminyl Brilliant Red F-B, available from Sumitomo Chemical Company (Japan), the Duasyn® line of "salt-free" dyes available from Clariant Corp., Charlotte, N.C., such as Duasyn® Direct Black HEF-SF (Direct Black 168), Duasyn®) Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The dye is present in the ink composition in any effective amount, typically from about 0.5 to about 15 percent by weight, and preferably from about 1 to about 10 percent by weight, although the amount can be outside of these ranges.

Also suitable as a colorant are pigment particles. The pigment can be of any desired color, such as black, cyan, magenta, yellow, red, blue, green, brown, or the like, as well as mixtures thereof. Examples of suitable pigments include various carbon blacks such as channel black, furnace black, lamp black, Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue2G (Pigment Blue 15:3), Hostafine® Black T (Pigment Black 7), and Hostafine® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, N.C.), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, N.C.), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871 K (BASF), Paliogen Red 3340 (BASF), and Lithol Fast Scarlet L4300 (BASF). Other pigments can also be selected. The pigment particles can be of any desired size. Typical average particle diameters for pigment particles in inks to be used in thermal ink jet printing processes, for example, are from about 0.001 to about 10 microns, preferably from about 0.01 to about 3 microns, and more preferably less than about 1 micron, although the average particle diameter can be outside these ranges. The pigment particles can be present in the ink in any desired amount. Typically the pigment particles are present in an amount of from about 1 to about 20 percent by weight, preferably from about 1 to about 10 percent by weight, more preferably from about 2 to about 8 percent by weight, and even more preferably from about 4 to about 7 percent by weight, although the amount can be outside these ranges.

Mixtures of one or more dyes and/or one or more pigments can also be employed for the colorant component of the inks of the present invention.

The ink compositions of the present invention also include an oxy acid and/or oxy acid salt additive. Oxy acid and oxy acid salt additives suitable for the inks of the present invention include those of the formulae

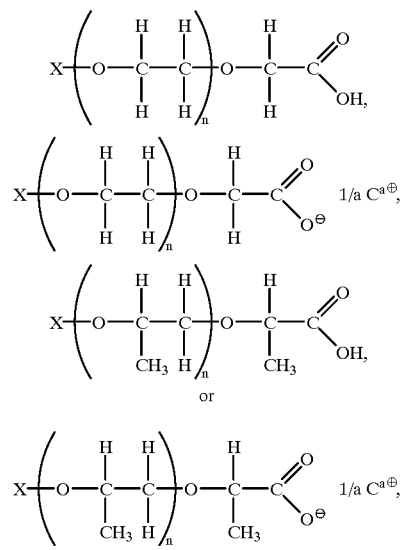

wherein X is

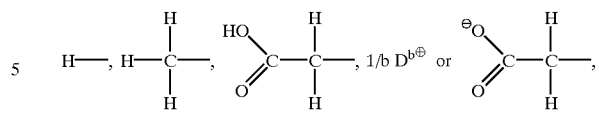

a and b are integers of 1, 2, 3, or 4, C and D are cations, such as (but not limited to) metal ions, including alkali metal ions, such as lithium, sodium, or potassium, alkaline earth metal ions, such as magnesium, calcium, or barium, transition metal ions, such as chromium, iron, nickel, zinc, or the like, nonmetallic cations, such as ammonium, alky- and/or aryl-substituted ammonium, including cations such as pyridinium and substituted pyridinium, imidazolinium and substituted imidazolinium, or the like, and n is an integer representing the number of repeat units, typically being from 0 to about 12, although the value can be outside of this range. One example of a suitable additive is 3,6-dioxaheptanoic acid, of the formula

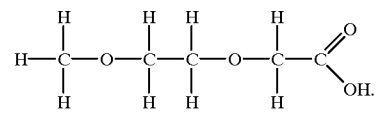

Another example of a suitable additive is 3,6,9-trioxadecanoic acid, of the formula

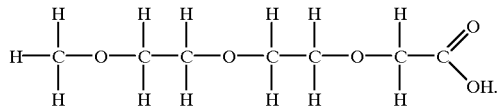

Another example of a suitable additive is 3,6,9-trioxaundecanedioic acid, of the formula

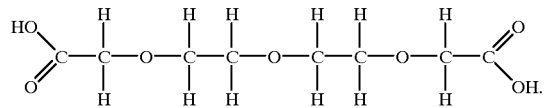

Another example of a suitable additive is polyglycol diacid, of the formula

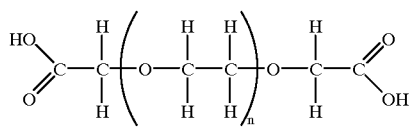

wherein n is an integer of from about 10 to about 12. Mixtures of two or more of these materials can also be employed. Materials of these formula are commercially available from, for example, Clariant Corp., Charlotte, N.C. The additive is present in the ink in any effective or desired amount, typically from about 0.1 to about 50 percent by weight of the ink, preferably from about 5 to about 20 percent by weight of the ink, and more preferably from about 10 to about 15 percent by weight of the ink, although the amount can be outside of these ranges.

The additive component of the inks of the present invention can function as a humectant, generally is compatible with a wide range of solvents and has good heat stability.

The presence of the additive can also enable advantages such as high optical density, desirable drying characteristics, good latency, the ability to prepare inks with relatively high dye concentrations, and the like.

In some embodiments of the present invention, an oxy acid is first reacted with a basic compound to generate a salt. In particular, when the free acid is added to the ink and generates an ink composition of undesirably low pH, the ink can be neutralized by addition of a base. Any suitable or desired base can be employed. Examples of suitable bases include inorganic bases, such as hydroxides, including alkali metal hydroxides, alkaline earth hydroxides, transition metal hydroxides, and the like, organic bases, such as aminobenzene, substituted aminobenzenes, and aminobenzene derivatives, ammonia, alkylammonium compounds, substituted alkylammonium compounds, and alkylammonium compound derivatives, such as diethylamine, diethanolamine, butylamine, methylamine, ethylene diamine, and the like, imidazole, substituted imidazoles, and imidazole derivatives, morpholine, substituted morpholines, and morpholine derivatives, pyridine, substituted pyridines, and pyridine derivatives, piperadine, substituted piperadines, and piperadine derivatives, proline, substituted prolines, and proline derivatives, quinoline, substituted quinolines, and quinoline derivatives, pyrimidine, substituted pyrimidines, and pyrimidine derivatives, pyrrolidine, substituted pyrrolidines, and pyrrolidine derivatives, and the like. The neutralizing base can also be selected to result in desired properties in the ink. Some specific examples of bases which can enable certain properties are as follows:

| | |
|---|---|
| $NH_3$ | compact, structure breaking cation |
| LiOH | compact, structure building cation |
| $(CH_3)_2N(C_8H_{17})$ | penetrant |
| $NH_2CH_2CH_2OCH_2CH_2OH$ | humectant |
| polyamine | dye fixation (waterfastness, antismear) |
| $NH_2(CH_2)_2NH_2$ | structure builder, dye precipitant |
| $(\phi NH)_2C=NH$ | dye precipitant, fixative |

The base and the acid are present in any suitable or desired relative amounts. Typically, the acid and the base are present in relative amounts such that the ink is of the desired pH; for example, if the acid has one acid functional group per molecule, the acid and base can be present in relatively equivalent stoichiometric amounts to achieve neutrality; if the acid has two acid functional groups per molecule, the acid and base can be present in a stoichiometric ratio of about 1 acid molecule to 2 base molecules to achieve neutrality. Excess base can also be present, particularly when weak bases are used; excess acid can also be present.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or bases, phosphate salts, carboxylates salts, sulfite salts, amine salts, and the like, present in an amount of from 0 to about 1 percent by weight of the ink and preferably from about 0.01 to about 1 percent by weight of the ink, or the like. One or more surfactants or wetting agents can also be added to the ink. These additives may be of the cationic, anionic, or nonionic types. Suitable surfactants and wetting agents include sodium lauryl sulfate, Tamol® SN, Tamol® LG, those of the Triton® series available from Rohm and Haas Company, those of the Marasperse® series, those of the Igepal® series available from GAF Company, those of the Tergitol® series, and other commercially available surfactants. These surfactants and wetting agents are present in effective amounts, generally from 0 to about 15 percent by weight, and preferably from about 0.01 to about 8 percent by weight, although the amount can be outside of this range.

The ink compositions are generally of a viscosity suitable for use in ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range, especially for applications such as acoustic ink jet printing.

Ink compositions of the present invention can be of any suitable or desired pH. For some embodiments, such as thermal ink jet printing processes, typical pH values are from about 3 to about 11, preferably from about 5 to about 10, and more preferably from about 6 to about 8.5, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering. Adjustment of pH can occur by addition of a base at any stage of the process.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared by simple mixing of the following ingredients: imidazole (obtained from Aldrich Chemical Co., Milwaukee, Wis.), 20 percent by weight; 3,6,9-trioxadecanoic acid (obtained from Clariant Corp., Charlotte, N.C.), 20 percent by weight; BASF X34 dye solution (containing 34 percent by weight dye solids, obtained from BASF), 20 percent by weight; and deionized water, 40 percent by weight. The resulting ink was hand coated onto Xerox® Image Series Smooth paper. The resulting images exhibited a solid area optical density of over 1.3 and a drying time of 8 to 10 seconds. In addition, the ink showed no signs of dye precipitation after standing for one week under ambient lab conditions.

EXAMPLE II

An ink composition was prepared by simple mixing of the following ingredients: sulfolane, 40 percent by weight; Acid Yellow 23 dye (Tartrazine), 5 percent by weight; 3,6,9-trioxadecanoic acid (obtained from Clariant Corp., Charlotte, N.C.), 10 percent by weight; butyl amine (obtained from Aldrich Chemical Co., Milwaukee, Wis.), 4.1 percent by weight (added to neutralize to pH=7); and deionized water, 40.9 percent by weight. The resulting ink, which had a viscosity of 4.0 centipoise, was hand coated onto Xerox® Image Series Smooth paper. The resulting images, which were smooth and nonmottled, exhibited a drying time of 1 to 2 seconds. In addition, the ink showed no signs of dye precipitation after standing for 24 hours under ambient lab conditions.

EXAMPLE III

An ink composition was prepared by simple mixing of the following ingredients: imidazole (obtained from Aldrich Chemical Co., Milwaukee, Wis.), 20 percent by weight; 3,6-dioxaheptanoic acid (obtained from Clariant Corp., Charlotte, N.C.), 20 percent by weight; Acid Yellow 23 dye (Tartrazine), 5 percent by weight; and deionized water, 55 percent by weight. The resulting ink, which had a viscosity of 2.6 centipoise, was hand coated onto Xerox® Image Series Smooth paper. The resulting images exhibited a drying time of 10 seconds. In addition, the ink showed no signs of dye precipitation after standing for one week under ambient lab conditions. This ink was fully buffered as a result of the presence of excess imidazole and the imidazole-3,6-dioxaheptanoic acid salt.

EXAMPLE IV

An ink composition was prepared by simple mixing of the following ingredients: butyl carbitol, 10 percent by weight; 3,6,9- trioxadecanoic acid ammonium salt (free acid previously neutralized with ammonia; free acid obtained from Clariant Corp., Charlotte, N.C.), 10 percent by weight; Acid Yellow 23 dye (Tartrazine), 5 percent by weight; and deionized water, 75 percent by weight. The resulting ink, which had a viscosity of 2.7 centipoise, was hand coated onto Xerox® Image Series Smooth paper. The resulting images exhibited a drying time of less than 1 second. The ink had an estimated surface tension of greater than about 40 dynes per centimeter.

EXAMPLE V

An ink composition was prepared by simple mixing of the following ingredients: 3,6,9-trioxadecanoic acid (obtained from Clariant Corp., Charlotte, N.C.), 11.3 percent by weight; dimethyl octyl amine (obtained from Akzo Nobel Chemical Co., Chicago, Ill.), 10 percent by weight; Acid Yellow 23 dye (Tartrazine), 5 percent by weight; and deionized water, balance. The resulting ink exhibited a viscosity of 3.3 centipoise at 25° C., a surface tension of from about 31 to about 34 dynes per centimeter, a drying time of about 1 second when hand coated onto Xerox® Image Series Smooth paper and Xerox® Image Series 10 paper, minimal feathering, no dye separation or evaporation, and good edge sharpness with low feathering. It is believed that this ink will also exhibit reduced intercolor bleed, particularly with carbon-black containing black inks.

EXAMPLE VI

An ink composition was prepared by simple mixing of the following ingredients: 3,6-dioxaheptanoic acid (obtained from Clariant Corp., Charlotte, N.C.), 10 percent by weight; dimethyl octyl amine (obtained from Akzo Nobel Chemical Co., Chicago, Ill.), 8.5 percent by weight; Acid Yellow 23 dye (Tartrazine), 5 percent by weight; and deionized water, balance. The resulting ink exhibited a viscosity of 3.6 centipoise at 25° C., a surface tension of from about 31 to about 34 dynes per centimeter, a drying time of about 1 second when hand coated onto Xerox® Image Series Smooth paper and Xerox® Image Series 10 paper, minimal feathering, no dye separation or evaporation, and good edge sharpness with low feathering. It is believed that this ink will also exhibit reduced intercolor bleed, particularly with anionic dye containing inks, such as those containing BASF X-34 dye, Food Black #2 dye, Direct Blue 199 dye, and PROJET MAGENTA 1T dye.

EXAMPLE VII

An ink composition was prepared by simple mixing of the following ingredients: 3,6-dioxaheptanoic acid (obtained from Clariant Corp., Charlotte, N.C.), 13 percent by weight; 2-(2-aminoethoxy)ethanol (obtained from Akzo Nobel Chemical Co., Chicago, Ill.), 10.5 percent by weight; Acid Yellow 23 dye (Tartrazine), 5 percent by weight; Nekal BA77 (sodium diisopropyl naphthalene sulfonate, available from GAF, Wayne, N.J.), 4 percent by weight; and deionized water, balance. The resulting ink exhibited a viscosity of 2.7 centipoise at 25° C., a surface tension of from about 30 to about 34 dynes per centimeter, a drying time of less than 1 second when hand coated onto Xerox® Image Series Smooth paper and Xerox® Image Series 10 paper, and minimal feathering. In this ink, it is believed that the acid and the base both act as humectants, and that rapid drying is enhanced by the alkyl aryl sulfonate.

It is believed that a similar ink composition wherein Food Black 2 dye is substituted for Acid Yellow 23 dye will exhibit similar characteristics.

EXAMPLE VIII

An ink composition was prepared by simple mixing of the following ingredients: 3,6-dioxaheptanoic acid (obtained from Clariant Corp., Charlotte, N.C.), 13 percent by weight; 2-(2-aminoethoxy)ethanol (obtained from Akzo Nobel Chemical Co., Chicago, Ill.), 10.5 percent by weight; butyl carbitol, 2 percent by weight; Acid Yellow 23 dye (Tartrazine), 5 percent by weight; and deionized water, balance. The resulting ink exhibited a viscosity of 3.2 centipoise at 25° C., a drying time of 2 seconds when hand coated onto Xerox® Image Series Smooth paper and Xerox® Image Series 10 paper, and minimal feathering.

A similar ink composition was prepared except that the amount of butyl carbitol was 5 percent by weight. The resulting ink exhibited a viscosity of 7.6 centipoise at 25° C.

EXAMPLE IX

An ink composition was prepared by simple mixing of the following ingredients: 3,6,9-trioxaundecanedioic acid (obtained from Clariant Corp., Charlotte, N.C.), 22 percent by weight; ethylene diamine, 10.5 percent by weight; Acid Yellow 23 dye (Tartrazine), 5 percent by weight; cyclohexylpyrrolidinone, 2 percent by weight; and deionized water, balance. The resulting ink exhibited a viscosity of 5.3 centipoise at 25° C., a drying time of 2 seconds when hand coated onto Xerox® Image Series Smooth paper and Xerox® Image Series 10 paper, and moderate MFLEN.

EXAMPLE X

The processes of Examples I through IX are repeated except that polyglycol diacid (commercially available from Clariant Corp., Charlotte, N.C.) is substituted for 3,6-dioxaheptanoic acid, 3,6,9-trioxadecanoic acid, and 3,6,9-trioxaundecanedioic acid. It is believed that similar results will be observed.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises (1) water; (2) a colorant; and (3) an additive selected from the group consisting of oxy acids, oxy acid salts, and mixtures thereof.

2. An ink composition according to claim 1 wherein the oxy acids and oxy acid salts are of the formulae

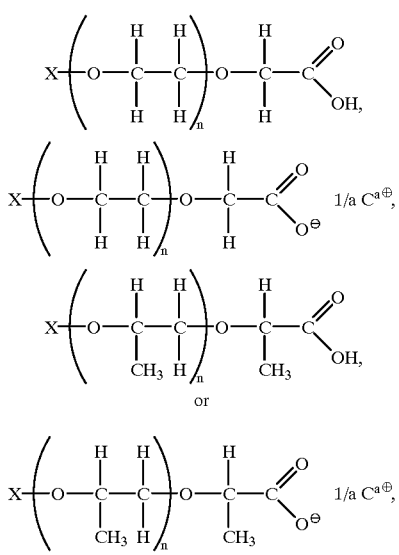

wherein X is

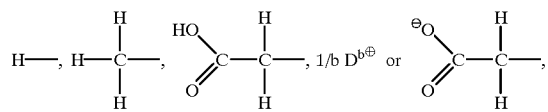

a and b are integers of 1, 2, 3, or 4, C and D are cations, and n is an integer representing the number of repeat units.

3. An ink composition according to claim 2 wherein X is —$CH_3$.

4. An ink composition according to claim 2 wherein X is —H.

5. An ink composition according to claim 2 wherein X is

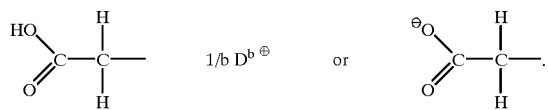

6. An ink composition according to claim 2 wherein n is from 0 to about 12.

7. An ink composition according to claim 2 wherein the additive is of the formulae

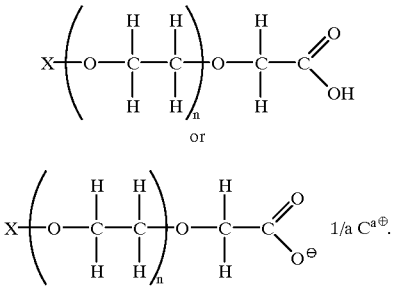

8. An ink composition according to claim 1 wherein the additive is 3,6-dioxaheptanoic acid or a 3,6-dioxaheptanoic acid salt.

9. An ink composition according to claim 1 wherein the additive is 3,6,9-trioxadecanoic acid or a 3,6,9-trioxadecanoic acid salt.

10. An ink composition according to claim 1 wherein the additive is 3,6,9-trioxaundecanedioic acid or a 3,6,9-trioxaundecanedioic acid salt.

11. An ink composition according to claim 1 wherein the additive is polyglycol diacid or a polyglycol diacid salt.

12. An ink composition according to claim 1 wherein the additive is present in the ink in an amount of from about 0.1 to about 50 percent by weight.

13. An ink composition according to claim 1 wherein the additive is present in the ink in an amount of from about 5 to about 20 percent by weight.

14. An ink composition according to claim 1 wherein the additive is an oxy acid salt resulting from neutralization of an oxy acid with a base.

15. An ink composition according to claim 14 wherein the base is selected from the group consisting of metal hydroxides, ammonia, aminobenzenes, alkylammonium compounds, imidazoles, morpholines, pyridines, piperadines, prolines, quinolines, pyrimidines, pyrrolidines, and mixtures thereof.

16. An ink composition according to claim 14 wherein the base is selected from the group consisting of ammonia, diethylamine, diethanolamine, butylamine, methylamine, ethylene diamine, imidazole, and mixtures thereof.

17. An ink composition according to claim 14 wherein the base is selected from the group consisting of $NH_3$, LiOH, $(CH_3)_2N(C_8H_{17})$, $NH_2CH_2CH_2OCH_2CH_2OH$, polyamine, $NH_2(CH_2)_2NH_2$, $(\phi NH)_2C=NH$, and mixtures thereof.

18. An ink composition according to claim 1 which is substantially free of organic solvents.

19. A printing process which comprises incorporating an ink composition according to claim 1 into an ink jet printing apparatus and causing droplets of the ink composition to be ejected in an imagewise pattern onto a substrate.

20. A printing process according to claim 19 wherein the printing apparatus employs a thermal ink jet process wherein the ink in the nozzles is selectively heated in an imagewise pattern, thereby causing droplets of the ink to be ejected in imagewise pattern.

* * * * *